United States Patent
Lou et al.

(10) Patent No.: US 7,433,425 B1
(45) Date of Patent: Oct. 7, 2008

(54) ADAPTIVE SIGNAL TUNING FOR DIGITAL RADIO RECEIVERS OPERATING, IN FM BANDS

(75) Inventors: Hui-Ling Lou, Palo Alto, CA (US); Dimitrios-Alexandros Toumpakaris, Sunnyvale, CA (US); Jungwon Lee, Stanford, CA (US)

(73) Assignee: Marvell International Ltd., Hamilton (BM)

( * ) Notice: Subject to any disclaimer, the term of this patent is extended or adjusted under 35 U.S.C. 154(b) by 831 days.

(21) Appl. No.: 10/792,194

(22) Filed: Mar. 3, 2004

Related U.S. Application Data

(60) Provisional application No. 60/518,761, filed on Nov. 10, 2003.

(51) Int. Cl.
*H04L 27/00* (2006.01)
(52) U.S. Cl. .................................................. 375/316
(58) Field of Classification Search ................. 375/316, 375/334, 346, 324, 354
See application file for complete search history.

(56) References Cited

U.S. PATENT DOCUMENTS 5,598,430 A * 1/1997 Hachisuka et al. .......... 375/216

FOREIGN PATENT DOCUMENTS

JP 2-154534 * 6/1990

OTHER PUBLICATIONS

Faller/Juang/Kroon/Lou/Ramprashad/Sundberg, "Technical Advances in Digital Audio Radio Broadcasting", Proceedings of the IEEE, vol. 90, No. 8, Aug. 2002, pp. 1303-1333.
IBiquity Digital Corporation, HD Radio™ Air Interface Design Description—Layer 1 FM, Rev. C, Mar. 7, 2003, pp. 1-106.

* cited by examiner

*Primary Examiner*—Kevin M Burd

(57) ABSTRACT

A radio receiver for receiving analog signals in a Frequency Modulation (FM) band includes a hybrid/all digital decoder that decodes a digital audio signal. An analog FM demodulator generates a demodulated analog audio signal. The analog FM demodulator demodulates the analog audio signal while the hybrid/all digital decoder simultaneously attempts to acquire synchronization. The digital radio receiver outputs the demodulated analog audio signal until synchronization is acquired.

20 Claims, 7 Drawing Sheets

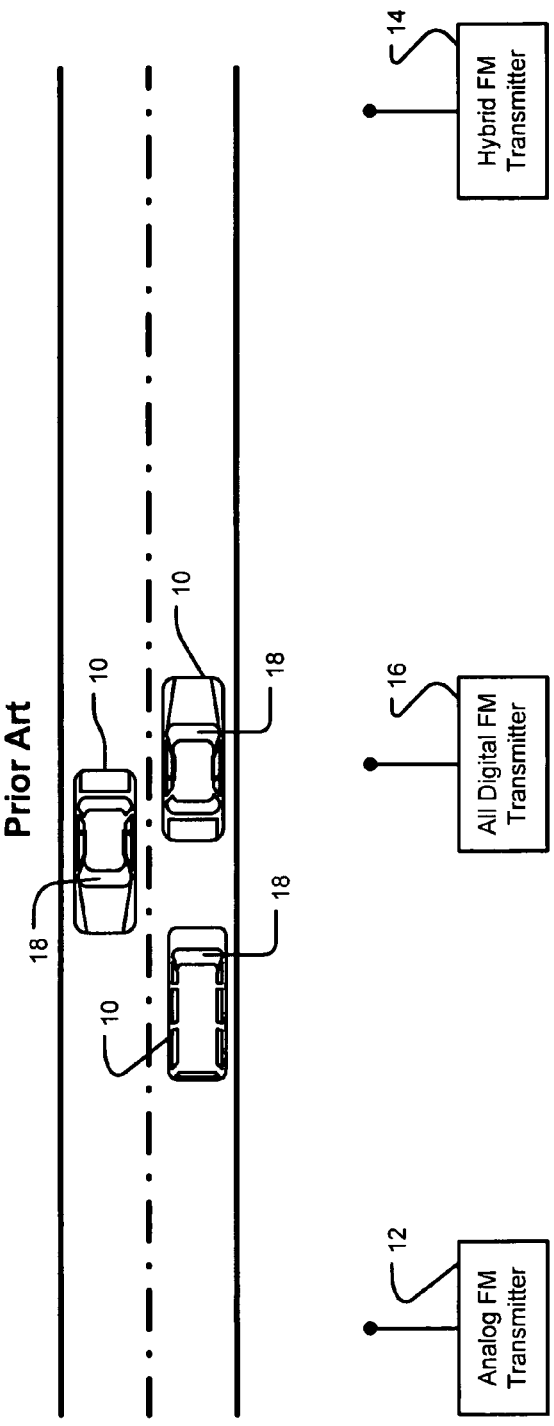
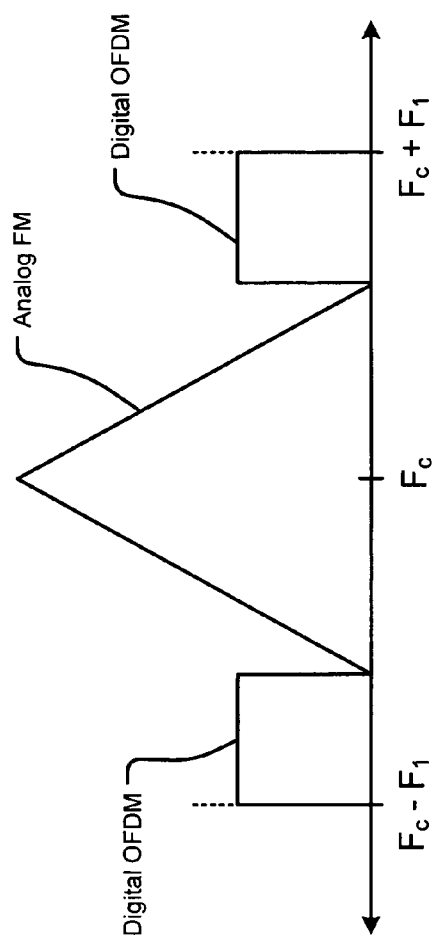
FIG. 1A
Prior Art
FIG. 1B
Prior Art

ADAPTIVE SIGNAL TUNING FOR DIGITAL RADIO RECEIVERS OPERATING, IN FM BANDS

CROSS-REFERENCE TO RELATED APPLICATIONS

This application claims the benefit of U.S. Provisional Application No. 60/518,761, filed on Nov. 10, 2003, which is hereby incorporated by reference in its entirety.

FIELD OF THE INVENTION

The present invention relates to radio receivers, and more particularly to radio receivers operating in the Frequency Modulation (FM) band.

BACKGROUND OF THE INVENTION

Digital radio receivers include an analog front end that receives FM band signals and an analog to digital (A/D) converter that converts the FM band signals to digital FM band signals. A decoder decodes the digital FM band signals to generate digital audio signals. The decoded digital audio signals provide CD-like audio with improved sound quality over analog-based audio signals.

Digital radio receivers also preferably maintain backward compatibility with existing analog-based audio signals in the FM band. When the digital radio receivers operate in a hybrid mode, the FM band signals contain both analog audio signals and digital audio signals. In the hybrid mode, a conventional analog FM receiver demodulates the FM band signals to produce analog audio signals and the decoder decodes the FM band signals to produce the digital audio signals.

For example and referring now to FIG. 1A, automobiles 10 traveling down a road may demodulate and/or decode FM band signals from a first radio transmitter 12, a second radio transmitter 14, and/or a third radio transmitter 16. The first transmitter 12 generates FM band signals that contain modulated analog audio signals. The second transmitter 14 generates FM band signals containing modulated analog audio signals and encoded digital audio signals, respectively. The third transmitter 16 generates FM band signals containing encoded all-digital audio signals. Digital radio receivers 18 in the automobiles 10 must be able to tune and receive all of these different types of FM band signals. As can be appreciated, stationary FM receivers may also receive the different FM signals. When the digital radio receiver is tuning into a radio program, it may not know which system is used to encode the received signal, which may cause tuning delays that are undesirable.

When the digital radio receiver first tunes into a program channel, the digital receiver determines the type of signal that is transmitted so that an appropriate receiver decoding algorithm can be applied. Currently, digital signals are typically coded using a hybrid In-Band-On-Channel (IBOC) Frequency Modulated (FM) system, which typically transmits the digital information at a lower power level than the analog host FM signal.

Referring now to FIG. 1B, a typical power spectrum of the hybrid signal is shown. $F_c$ denotes the center frequency of a program channel. $F_c$ is located in the range of 88-108 MHz for FM broadcasts in the US. In the hybrid IBOC-FM mode, the digital signal portion is transmitted in sidebands on both sides of the analog host signal, in other words $F_c-F_1$ and $F_c+F_1$. For example, $F_1$ may be equal to 200 kHz. In this example, the composite signal is 400 kHz wide while traditional FM program channels are 200 kHz wide.

The digital information is typically transmitted using an Orthogonal Frequency Division Modulation (OFDM) approach. The details of one suitable transmission scheme are described in ["HD Radio Air Interface: Design Description—Layer 1 FM", Reference C, Mar. 7, 2003] (hereinafter "the Draft Standard"), which is available from the National Radio Systems Committee (NRSC) that oversees the standard setting activities for digital radio receivers and which is hereby incorporated by reference in its entirety.

As more consumers purchase digital radio receivers, traditional analog FM transmission will eventually be turned off and the entire frequency band will be used for transmission of digital radio that will enable higher quality audio and/or provide bandwidth for other data programming. This system configuration is the all digital IBOC mode, which is described in the Draft Standard of the IBOC-FM system identified above.

Referring now to FIG. 2, a functional block diagram of the physical layer of one suitable IBOC-FM transmitter 30 is shown. A detailed discussion of IBOC-FM transmitter 30 will not be provided but can be found in the Draft Standard. The digital data bitstream from Layer 2 40 is output to a scrambler 44 and then to a channel encoder 46. The scrambler 44 randomizes the data. The channel encoder 46 introduces redundancy to protect the bits from noise and channel fading. The coded frame of bits is output to an interleaver 48, which rearranges bits of one symbol or frame with bits of another symbol or frame. The output of the interleaver 48 is input to an OFDM subcarrier mapper 52, which maps pairs of bits to Quadrature Phase Shift Keying (QPSK) symbols before being assigned to OFDM subcarriers. An output of the OFDM subcarrier mapper 52 is input to an OFDM signal generator 54 and a transmission subsystem 58.

Depending on the mode of operation for the current frame of data, a different number of OFDM subcarriers may be used. In each OFDM symbol, some subcarriers are reserved for control information. These subcarriers are known as the Reference Subcarriers. The control signal is coded separately from the data frames. The control signal contains pilots for synchronization and information on the modes of operation of the current frames. After the subcarrier mapping, the transmitter performs an Inverse Discrete Fourier Transform (DFT) (that can be implemented using a Fast Fourier Transform (FFT)) and appends a cyclic prefix to form an OFDM symbol in the time domain. The OFDM symbol is then transmitted by the transmission subsystem 58.

SUMMARY OF THE INVENTION

A radio receiver according to the present invention for Frequency Modulation (FM) band signals includes a hybrid/all digital decoder that decodes the FM band signals to generate a digital audio signal. An analog FM demodulator demodulates the FM band signals to generate an analog audio signal. The analog FM demodulator generates the analog audio signal while the hybrid/all digital decoder simultaneously attempts to acquire synchronization. The digital radio receiver outputs the analog audio signal until synchronization is acquired.

In other features, an RF front end receives the FM band signals and has an output that communicates with an A/D converter. The analog to digital (A/D) converter converts the FM band signals to digital signals. A system selector generates selecting signals. An audio decoding and blending circuit communicates with the hybrid/all digital decoder and the analog FM demodulator. A multiplexer selects an output of the audio decoding and blending circuit or an output of the analog FM demodulator and is controlled by the system selector.

In other features, a first switch is arranged between the A/D converter and the hybrid/all digital decoder. A second switch is arranged between the analog FM demodulator and the A/D converter. The system selector controls the first and second switches.

In still other features, the decoder includes a time/frequency synchronizer and a Discrete Fourier Transformer (DFT) that communicates with an output of the time/frequency synchronizer. A demodulator demodulates an output of the DFT. A deinterleaver deinterleaves an output of the demodulator. A channel code decoder decodes an output of the deinterleaver. A descrambler communicates with an output of the channel code decoder. An extract controller determines when synchronization is acquired and controls at least one of the DFT, the demodulator, the deinterleaver, the channel code decoder and the descrambler.

In still other features, the analog FM demodulator generates an analog FM detect signal that is output to the system selector. The system selector generates the selecting signals based on the analog FM detect signal. The hybrid/all digital decoder generates a synchronization detect signal that is output to the system selector. The system selector generates the selecting signals based on the synchronization detect signal. The system selector and the multiplexer select the analog audio signal until the synchronization detect signal is generated and the output of the audio decoding and blending circuit after the synchronization detect signal is generated.

In other features, the digital signals are encoded using Orthogonal Frequency Division Modulation (OFDM).

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1A illustrates an automobile that receives FM band signals containing modulated analog audio signals, hybrid FM signals and/or encoded all-digital signals;

FIG. 1B illustrates a power spectrum for a hybrid IBOC-FM system in which the digital signal is carried adjacent to the analog FM bands;

DETAILED DESCRIPTION OF THE PREFERRED EMBODIMENTS

Figure 2:
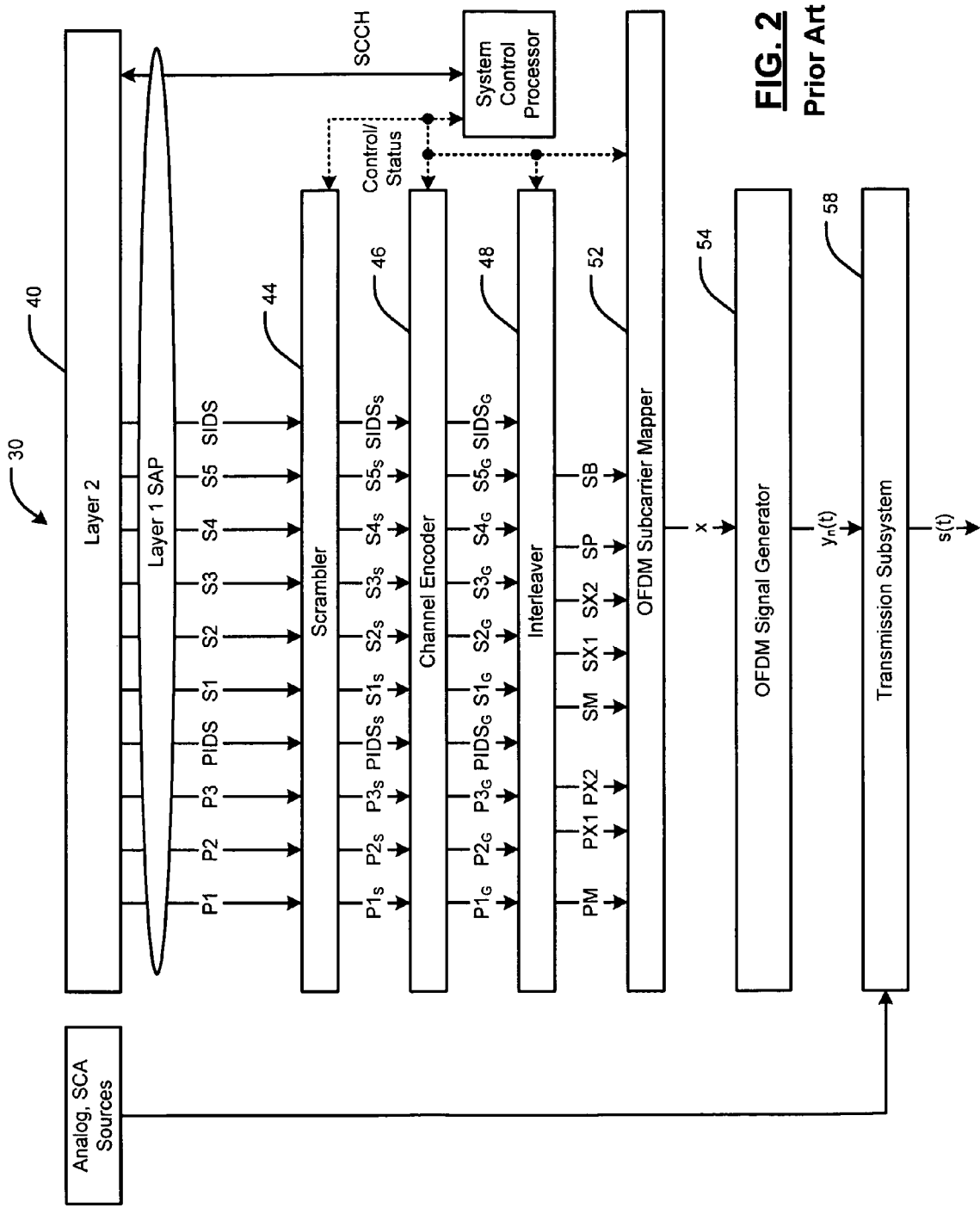
FIG. 2 is an exemplary functional block diagram of an IBOC-FM Transmission Interface according to the prior art.

The following description of the preferred embodiment(s) is merely exemplary in nature and is in no way intended to limit the invention, its application, or uses. For purposes of clarity, the same reference numbers will be used in the drawings to identify similar elements.

An adaptive tuning method and apparatus according to the present invention for a digital radio receiver identifies whether the FM band signals contain modulated analog audio signals, hybrid signals (modulated analog audio signals and encoded digital audio signals) or encoded all-digital signals. The adaptive tuning method and apparatus also ensures minimal tuning delay and the best possible decoded audio quality.

Figure 3A:
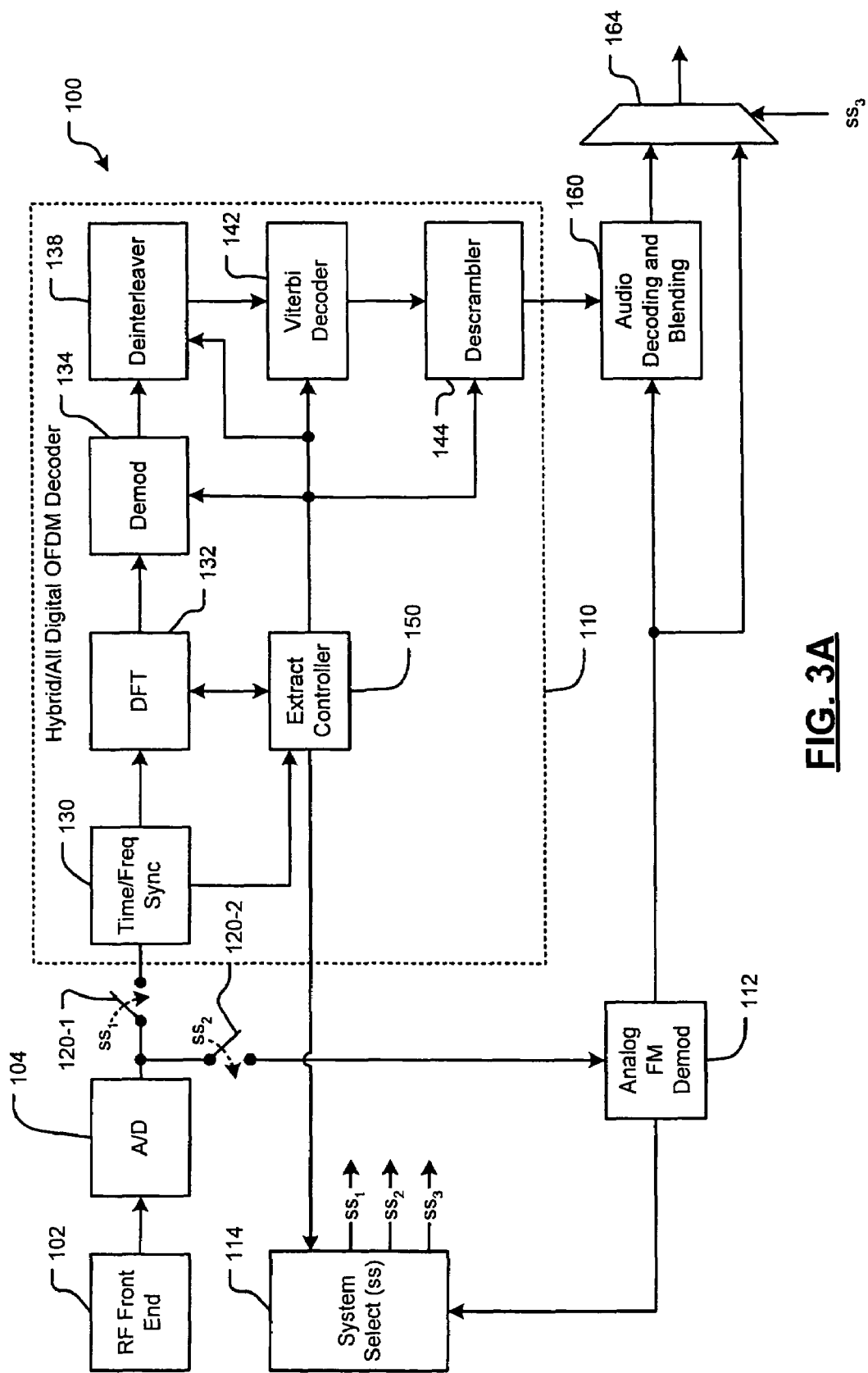
FIGS. 3A and 3B are functional block diagrams of exemplary FM radio receivers according to the present invention.

Referring now to FIG. 3A, one implementation of an FM radio receiver is shown generally at 100. The FM radio receiver may implement IBOC-FM. An RF front end 102 receives analog FM band signals and outputs the received analog FM band signals to an analog to digital (A/D) converter 104. A digital output of the A/D converter 104 is selectively connected to a hybrid/all digital OFDM detector 110. The output of the RF front end 102 and/or the A/D converter 104 are selectively output to an analog FM demodulator 112. In one embodiment, a system selector 114 generates system selector signals ($ss_1$, $ss_2$, and $ss_3$) that are used to control one or more switches 120-1 and 120-2 and/or multiplexers 164.

The hybrid/all digital decoder 110 performs the inverse of the coding that is performed in FIG. 2. In one implementation, the decoder 110 may be an OFDM decoder. The decoder 110 includes a time/frequency synchronizer 130 that receives the output of the A/D converter 104 and that attempts to synchronize time/frequency with the received signal using a suitable synchronization technique. An output of the time/frequency synchronizer 130 is input to a Discrete Fourier Transform (DFT) module 132, which calculates the frequency spectrum data. An output of the DFT module 132 is input to a demodulator 134, which demodulates the signal. An output of the demodulator 134 is input to a deinterleaver 138, which has an output that is connected to a Viterbi decoder unit 142. The deinterleaver 138 reverses the interleave operation performed by the interleaver 48. An output of the Viterbi decoder unit 142 is input to a descrambler 144. The descrambler 144 reverses the randomization performed by the scrambler 44. An extract controller 150 determines whether synchronization is achieved, extracts the reference subcarriers, and communicates with and coordinates control of the DFT 132, the demodulator 134, the deinterleaver 138, the Viterbi decoder unit 142 and/or the descrambler 144. In one implementation, the DFT module 132 implements a Fast Fourier Transform (FFT).

An output of the analog FM demodulator 112 and the descrambler 144 are input to an audio decoding and blending module 160, which performs audio decoding and blends analog and digital audio signals during transitions when the output signal is switched from analog audio to digital audio and vice versa. The output of the audio decoding and blending module 160 and the analog FM demodulator 112 are input to a multiplexer 164. The system selector 114 selects either the output of the audio decoding and blending module 160 or the output of the analog FM demodulator 112 using the select signal $ss_3$, as will be described below.

If the analog audio signal is the only received signal, the analog FM demodulator 112 is used to obtain the demodulated audio bitstream. If a hybrid IBOC-FM signal is received, the digital OFDM receiver 110 detects and decodes the bitstream by performing inverse operations of those used in the OFDM transmitter, such as deinterleaving, channel decoding and descrambling. If the signal is not successfully decoded by the OFDM decoder 110, the analog FM demodulator 112 will demodulate the FM band signals and generate the analog audio signal. The audio output will be based on the analog audio signal. If an encoded all-digital signal is received, the control signals will configure the OFDM decoder 110 to decode the all digital bitstream.

The receiver of an IBOC-FM system does not know the type of signal that is transmitted when the receiver first tunes into an FM program channel. The system can expect to receive a modulated analog audio signal only, a hybrid IBOC signal that contains a modulated analog audio signal and an encoded digital audio signal, or an encoded all-digital IBOC signal. Since the IBOC-FM digital OFDM signal does not contain preambles (such as those used in wireless networks such as IEEE 802.11a/g systems) or training OFDM symbols, the OFDM decoder 110 has to obtain frequency and time synchronization using suitable synchronization techniques, perform DFT, obtain frame synchronization and then extract the information contained in the reference subcarriers in order to determine the mode of operation of the current frame. This synchronization operation may have to be performed over multiple frames and can introduce tuning delays, which are undesirable. In addition, if the modulated analog audio signal is the only transmitted signal, synchronization will not be achieved. Therefore, when the receiver first tunes into a program channel, a detection procedure determines whether the transmitted program is a modulated analog audio signal only, a hybrid IBOC-FM signal or an encoded all-digital IBOC-FM signal.

When an IBOC-FM receiver first tunes into a program channel, it simultaneously attempts to demodulate a modulated analog audio signal and performs synchronization algorithms to attempt to detect an IBOC digital signal. If an analog audio signal is successfully demodulated before synchronization is achieved for digital IBOC-FM transmission, the receiver outputs the analog FM program to minimize tuning delay. In other words, the listener can listen to the FM station based on the analog audio signal while the digital component is being tuned.

In the meantime, the receiver continues to attempt to acquire synchronization of the digital bitstream. If synchronization is achieved for the OFDM digital signal, a hybrid IBOC system is detected. The OFDM receiver will decode the digital bitstream and switch or blend to the higher quality digital audio bitstream as soon as possible. The blending can be done using algorithms that gradually change the source of the output audio from the analog audio signal to the digital OFDM signal in order to avoid sudden changes in the output audio quality.

On the other hand, if an analog audio signal cannot be demodulated and/or detected, this implies that either there is no program transmitted in the program channel or that the transmitted signal is an all digital IBOC signal. The digital receiver 100 will wait for the OFDM receiver to successfully acquire synchronization and extract the Secondary Channel Indicator (SCI) control signal as specified in the IBOC-FM Draft Standard to determine whether an all digital signal is being transmitted.

The adaptive tuning method and apparatus according to the present invention operates as follows: When a receiver first tunes into a program channel, it will decode the FM band signals as if it is a hybrid IBOC system. The adaptive tuning method and apparatus simultaneously demodulates the FM band signals to generate analog audio signals and attempts to acquire synchronization of the digital FM transmission to extract the control information embedded in the transmitted OFDM symbol. In this example, the receiver determines whether the FM band signals contain analog audio signals. If the analog audio signals are detected, the receiver outputs the demodulated analog audio signal to minimize tuning delay. If the receiver does not have a mechanism to identify the presence of analog audio signals, the receiver can always demodulate the received signal (and assume that it is an analog audio signal) to minimize tuning delay.

While outputting the analog audio signal, the receiver continues to attempt to acquire synchronization for the OFDM signal. If synchronization is achieved, the decoder decodes the OFDM bitstream, blends the decoded digital signal with the demodulated analog audio signal and switches to the hybrid digital signal.

If no analog audio signal is detected, the receiver continues to attempt to acquire synchronization of the OFDM signal and to detect an analog audio signal. In one implementation, a timer is used to operate a predetermined timeout for detecting an analog or digital signal. If the receiver fails to acquire any signals within the predetermined timeout period, the receiver will stop the tuning process. This timer may be used in conjunction with a Seek and/or Scan function that are typically implemented in vehicle radio systems. The Seek function selectively increases or decreases the tuned frequency until a station is acquired. The Scan function selectively increases or decreases the tuned frequency, pauses for a predetermined period at stations are acquired and continues to the next station after the predetermined period expires unless the Scan function is cancelled.

If the OFDM synchronization circuit is able to acquire synchronization for the digital transmission when the receiver first tunes into a program channel, it decodes the embedded control information and determines whether the current transmitted FM band signals are hybrid signals or all digital signals by looking at the SCI control bit. If a hybrid system is detected and decoded successfully, the receiver outputs the hybrid digital signals. If all digital signals are detected, the all digital audio signal will be output as soon as it is successfully decoded.

Figure 3B:
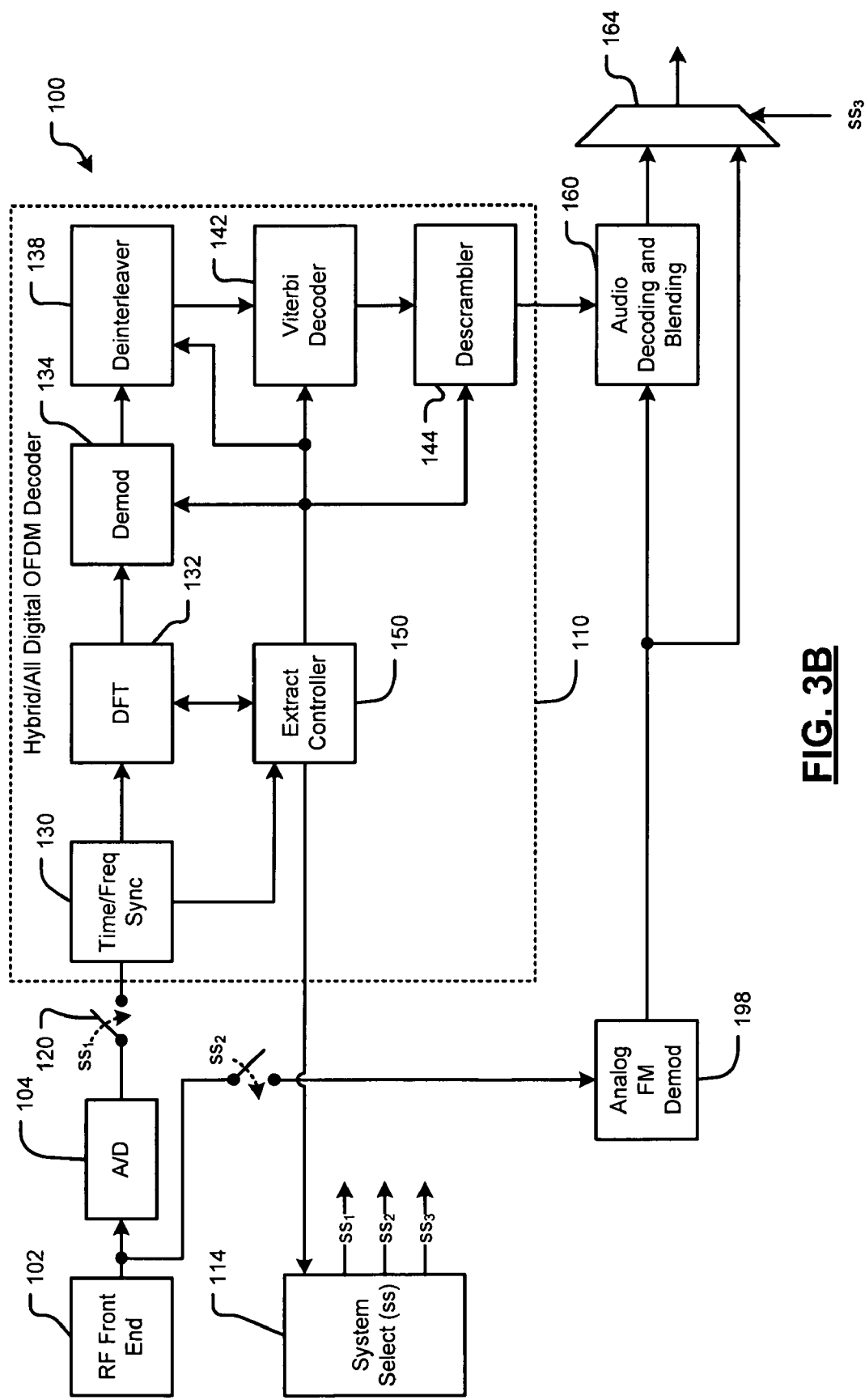

Referring now to FIG. 3B, the analog FM demodulator 198 receives an output of the RF front end 102. The analog FM demodulator 198 demodulates the analog received signals. The analog FM demodulator 112 in FIG. 3A receives an output of the A/D converter 104 and demodulates the digital output thereof. Both demodulators 112, 198 generate an analog FM detect control signal, which is output to the system selector 114, in addition to the demodulated analog audio signals.

Figure 4:
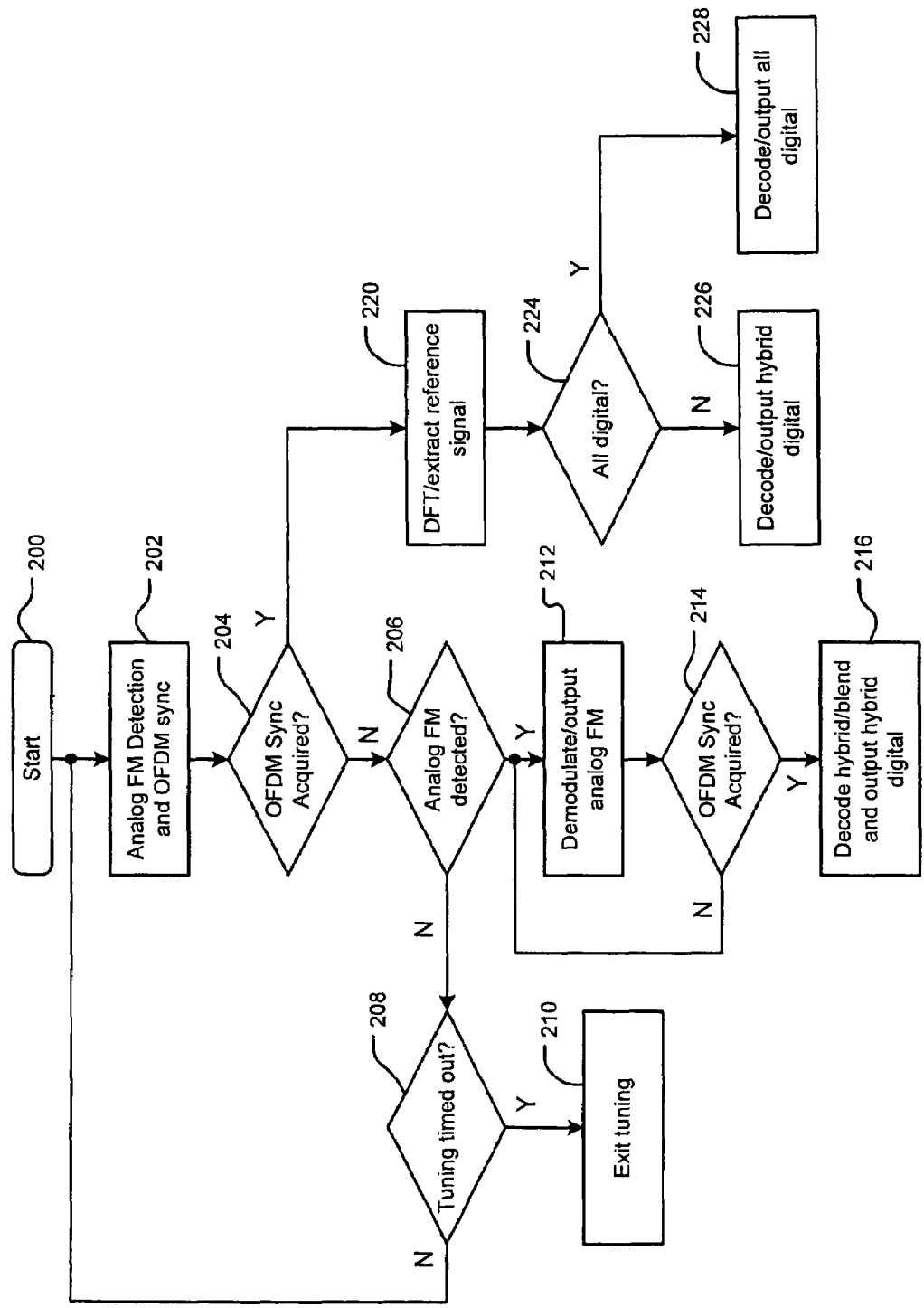
FIGS. 4-6 are flowcharts illustrating steps of exemplary adaptive tuning methods according to the present invention for the FM radio receivers of FIGS. 3A and 3B.

Referring now to FIG. 4, steps of the adaptive tuning method according to the present invention are shown. Control begins in step 200. In step 202, analog FM detection and OFDM synchronization is performed. In step 204, control determines whether OFDM sync is acquired. If not, control determines whether analog FM is detected in step 206. If not, control determines whether a predetermined tuning period has timed out in step 208. If not, control loops back to step 202. If step 208 is true, control exits tuning in step 210. Steps 208 and 210 may be used with Seek and Scan functions, as described above.

If step 206 is true and the analog audio signal is detected, control demodulates/outputs the analog audio signals in step 212. In step 214, control determines whether an OFDM sync is acquired. If not, control loops back to step 212. If step 214 is true, control decodes the hybrid signal, initiates blending and then outputs the hybrid digital signals.

If step 204 is true, control performs DFT and extracts a reference signal in step 220. In step 224, control determines whether the signal is all digital. If false, control decodes and outputs the hybrid digital signals in step 226. Otherwise, control decodes and outputs an all digital signal in step 228.

Figure 5:
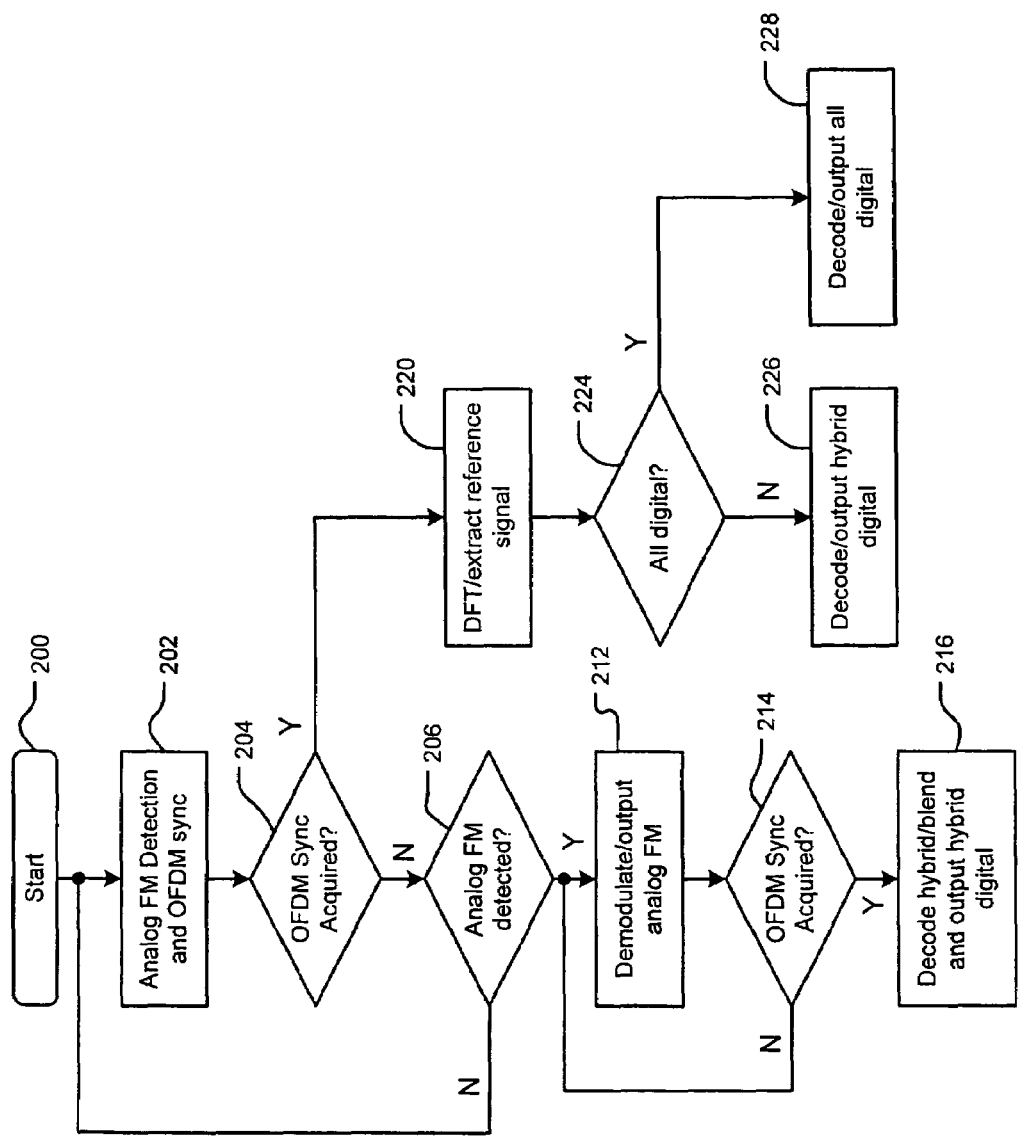

As can be appreciated, there are other ways of implementing the adaptive tuning method according to the present invention. Referring now to FIG. 5, when the analog audio signal is not detected in step 206, control returns directly to step 202 instead of executing steps 208 and 210.

Figure 6:
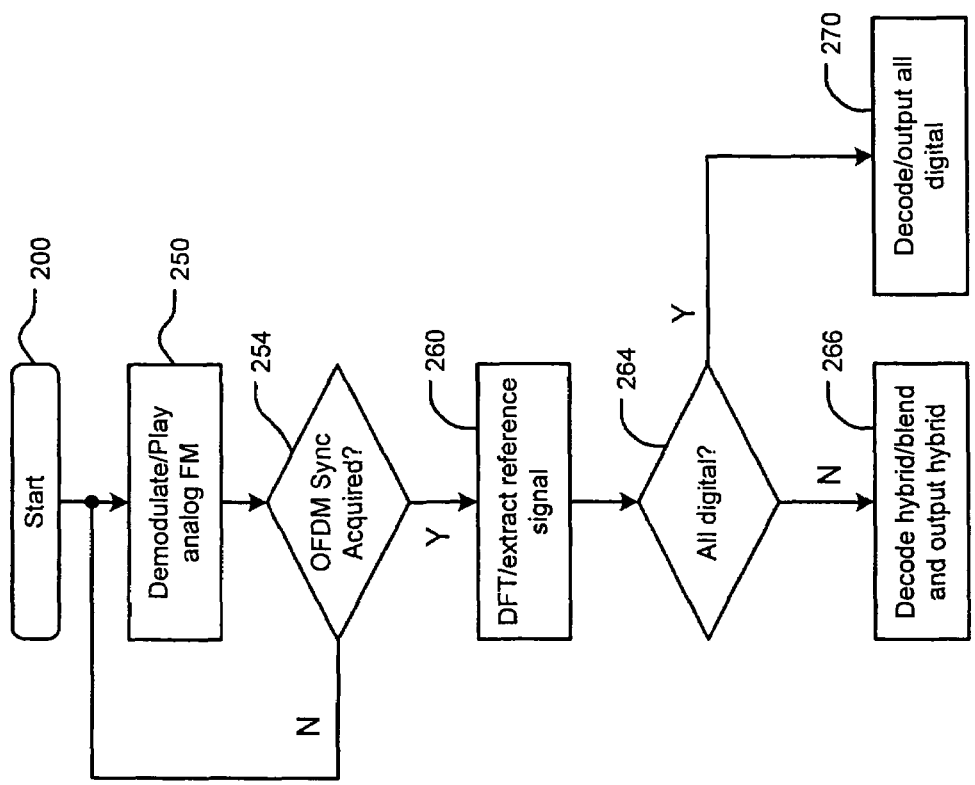

Referring now to FIG. 6, the analog audio signals are demodulated and output in step 250. This may result in noise or static if no analog audio signal is present. In step 254, control determines whether the OFDM sync is acquired. If not, control loops back to step 250. Otherwise, in step 260, control performs DFT and extracts the reference signal. In step 264, control determines whether the signal is all digital. If not, control decodes the hybrid signal, blends the signal with the analog audio signals and transitions to the hybrid digital signals in step 266. Otherwise, in step 270, control decodes and outputs the all digital signals. Still other variations can be made to the adaptive tuning method in addition to those shown in FIGS. 4-6 without departing from the scope of the present invention.

The digital radio receiver can be implemented in a module and/or device that includes an application specific integrated circuit (ASIC), an electronic circuit, a processor (shared, dedicated, or group) and memory that execute one or more software or firmware programs, a combinational logic circuit, and/or other suitable components that provide the described functionality.

To save processing time and/or power, the analog FM demodulator can be disconnected by the switch 120-2 after blending to the hybrid digital signals and/or the all digital signals. Alternately, the analog FM demodulator can continue to be connected after blending to the hybrid digital signals to provide a backup signal if the hybrid digital signals are lost. Other options include connecting the analog FM demodulator when the hybrid digital signals degrade. Likewise, after failing to obtain OFDM sync for a predetermined period, the hybrid/all digital decoder can be disconnected by the switch 120-1. Still other variations will be apparent to skilled artisans.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A radio receiver for a Frequency Modulation (FM) band signals, comprising:
    a hybrid/all digital decoder that acquires synchronization and decodes said FM band signals to generate digital audio signals;
    an analog FM demodulator that demodulates said FM band signals to generate analog audio signals;
    an RF front end that receives said FM band signals; and
    an analog to digital (A/D) converter that converts said FM band signals from said RF front end to digital signals, wherein said analog FM demodulator generates said analog audio signals while said hybrid/all digital decoder attempts to acquire synchronization, and wherein said radio receiver outputs said analog audio signals until said synchronization is acquired.

2. The radio receiver of claim 1 wherein said analog FM demodulator communicates with an output of said A/D converter.

3. The radio receiver of claim 1 further comprising:
    a system selector that generates selecting signals;
    an audio decoding and blending circuit that communicates with said hybrid/all digital decoder and said analog FM demodulator; and
    a multiplexer that selects one of an output of said audio decoding and blending circuit and an output of said analog FM demodulator and that is controlled by said system selector.

4. The radio receiver of claim 3 further comprising:
    a first switch that is arranged between said A/D converter and said hybrid/all digital decoder; and
    a second switch that is arranged betweens said analog FM demodulator and said A/D converter,
    wherein said system selector controls said first and second switches.

5. The radio receiver of claim 3 wherein said analog FM demodulator generates an analog FM detect signal that is output to said system selector and wherein said system selector generates said selecting signals based on said analog FM detect signal.

6. The radio receiver of claim 3 wherein said hybrid/all digital decoder generates a synchronization detect signal that is output to said system selector and wherein said system selector generates said selecting signals based on said synchronization detect signal.

7. The radio receiver of claim 6 wherein said system selector and said multiplexer select said analog audio signal until said synchronization detect signal is generated and said output of said audio decoding and blending circuit after said synchronization detect signal is generated.

8. The radio receiver of claim 1 wherein said digital signals are encoded using Orthogonal Frequency Division Modulation (OFDM).

9. A radio receiver for a Frequency Modulation (FM) band signals, comprising:
    a hybrid/all digital decoder that acquires synchronization and decodes said FM band signals to generate digital audio signals, said hybrid/all digital decoder comprises a time/frequency synchronizer,
    a Discrete Fourier Transformer (DFT) that communicates with an output of said time/frequency synchronizer,
    a demodulator that demodulates an output of said DFT,
    a deinterleaver that deinterleaves an output of said demodulator,
    a channel code decoder that decodes an output of said deinterleaver, and
    a descrambler that reorders bits of an output of said channel code decoder; and
    an analog FM demodulator that demodulates said FM band signals to generate analog audio signals,
    wherein said analog FM demodulator generates said analog audio signals when said hybrid/all digital decoder attempts to acquire synchronization, and wherein said radio receiver outputs said analog audio signals until said synchronization is acquired.

10. The radio receiver of claim 9 further comprising an extract controller that determines when synchronization is acquired and that controls at least one of said DFT, said demodulator, said deinterleaver, said channel code decoder and said descrambler.

11. A method for operating a digital radio receiver, comprising:
    receiving FM band signals;
    demodulating said FM band signals to generate analog audio signals and attempting to acquire synchronization of encoded digital audio signals;
    outputting said analog audio signals until said synchronization is acquired;

decoding said FM band signals to generate digital audio signals after synchronization is acquired;

generating hybrid digital signals if said synchronization is acquired after said analog audio signals are detected by blending said analog audio signals and said digital audio signals; and converting said FM band signals to digital signals, wherein said digital signals are encoded using Orthogonal Frequency Division Modulation (OFDM).

12. A radio receiver for Frequency Modulation (FM) band signals, comprising:

decoding means for attempting to acquire synchronization and for decoding said FM band signals to generate digital audio signals;

analog FM demodulating means for demodulating said FM band signals to generate analog audio signals;

wherein said analog FM demodulating means generates said analog audio signals while said decoding means attempts to acquire synchronization, and wherein said radio receiver outputs said analog audio signals until said synchronization is acquired;

front end means for receiving said FM band signals; and converting means for converting said FM band signals to digital signals.

13. The radio receiver of claim 12 wherein said analog FM demodulating means communicates with an output of said converting means.

14. The radio receiver of claim 12 further comprising:

system selecting means for generating selecting signals;

decoding and blending means that communicates with said decoding means and said analog FM demodulating means for blending said analog audio signals and said digital audio signals during transitions; and multiplexing means for selecting an output of said decoding and blending means and an output of said analog FM demodulating means based on said selecting signals.

15. The radio receiver of claim 14 further comprising:

first switching means for switching that is arranged between said converting means and said decoding means; and second switching means for switching that is arranged between said analog FM demodulating means and said converting means, wherein said system selecting means controls said first and second switching means.

16. The radio receiver of claim 14 wherein said analog FM demodulating means generates an analog FM detect signal that is output to said system selecting means and wherein said system selecting means generates said selecting signals based on said analog FM detect signal.

17. The radio receiver of claim 14 wherein said decoding means generates a synchronization detect signal that is output to said system selecting means and wherein said system selecting means generates said selecting signals based on said analog FM detect signal.

18. The radio receiver of claim 17 wherein said system selecting means and said multiplexing means select said demodulated analog audio signal until said synchronization detect signal is generated and select said output of said decoding and blending means after said synchronization detect signal is acquired.

19. A radio receiver for Frequency Modulation (FM) band signals, comprising:

decoding means for attempting to acquire synchronization and for decoding said FM band signals to generate a digital audio signal, said decoding means comprises synchronizing means for synchronizing with said digital audio signal, transform means that communicates with an output of said synchronizing means for converting said digital audio signal from a time domain to a frequency domain, digital FM demodulating means for demodulating an output of said transform means, deinterleaving means for deinterleaving an output of said digital FM demodulating means, channel decoding means for decoding channel code in an output of said deinterleaving means, and descrambling means for descrambling an output of said channel decoding means; and analog FM demodulating means for demodulating said FM band signals to generate analog audio signals, wherein said analog FM demodulating means generates said analog audio signals while said decoding means attempts to acquire synchronization, and wherein said radio receiver outputs said analog audio signals until said synchronization is acquired.

20. The radio receiver of claim 19 further comprising extract control means for determining when synchronization is acquired and for generating control signals for at least one of said transform means, said digital FM demodulating means, said deinterleaving means, said channel decoding means and said descrambler.

* * * * *

UNITED STATES PATENT AND TRADEMARK OFFICE
CERTIFICATE OF CORRECTION

PATENT NO. : 7,433,425 B1
APPLICATION NO. : 10/792194
DATED : October 7, 2008
INVENTOR(S) : Hui-Ling Lou et al.

Page 1 of 1

It is certified that error appears in the above-identified patent and that said Letters Patent is hereby corrected as shown below:

On the Title Page Item -54-
Title                Delete "," after OPERATING
Column 8, Line 11    Delete "betweens" and insert -- between --

Signed and Sealed this

Ninth Day of December, 2008

JON W. DUDAS
*Director of the United States Patent and Trademark Office*

UNITED STATES PATENT AND TRADEMARK OFFICE
CERTIFICATE OF CORRECTION

PATENT NO. : 7,433,425 B1 Page 1 of 1
APPLICATION NO. : 10/792194
DATED : October 7, 2008
INVENTOR(S) : Hui-Ling Lou et al.

It is certified that error appears in the above-identified patent and that said Letters Patent is hereby corrected as shown below:

On the Title Page Item -54- and Column 1, line 2,
Title             Delete "," after OPERATING
Column 8, Line 11 Delete "betweens" and insert -- between --

This certificate supersedes the Certificate of Correction issued December 9, 2008.

Signed and Sealed this

Thirtieth Day of December, 2008

JON W. DUDAS
*Director of the United States Patent and Trademark Office*